United States Patent
Amemiya

(10) Patent No.: US 7,271,926 B2
(45) Date of Patent: Sep. 18, 2007

(54) IMAGE PRINTING APPARATUS, IMAGE PRINTING SYSTEM, IMAGE DATA PROCESSING METHOD AND MEMORY MEDIUM

(75) Inventor: Masami Amemiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1129 days.

(21) Appl. No.: 09/727,485

(22) Filed: Dec. 4, 2000

(65) Prior Publication Data

US 2002/0012129 A1    Jan. 31, 2002

(30) Foreign Application Priority Data

Dec. 6, 1999    (JP)    ................................. 11-345936

(51) Int. Cl.
    *G06F 15/00*    (2006.01)
(52) U.S. Cl. .................... 358/1.15; 358/1.13; 358/1.14; 358/1.16
(58) Field of Classification Search ............... 358/1.15, 358/1.13, 1.14, 1.16, 1.17; 270/1.01, 32, 270/52.01
    See application file for complete search history.

(56) References Cited

U.S. PATENT DOCUMENTS

| | | | | |
|---|---|---|---|---|
| 5,129,639 A | * | 7/1992 | DeHority | ................... 270/1.01 |
| 5,287,194 A | * | 2/1994 | Lobiondo | ................... 358/296 |
| 5,608,910 A | * | 3/1997 | Shimakura | ................... 718/100 |
| 6,426,801 B1 | * | 7/2002 | Reed | .......................... 358/1.16 |
| 6,606,163 B1 | * | 8/2003 | Suzuki et al. | ............... 358/1.15 |
| 6,631,239 B1 | * | 10/2003 | Hamada | ....................... 386/52 |
| 6,873,426 B1 | * | 3/2005 | Farrell | ....................... 358/1.15 |

FOREIGN PATENT DOCUMENTS

| | | | |
|---|---|---|---|
| EP | 673156 A2 | * | 9/1995 |
| JP | 09-284509 | * | 10/1997 |

* cited by examiner

*Primary Examiner*—Cheukfan Lee
(74) *Attorney, Agent, or Firm*—Fitzpatrick, Cella, Harper & Scinto

(57) ABSTRACT

An image printing apparatus, an image printing system, an image processing method and a memory medium are provided for preventing the image printing apparatus from being occupied for a long time by a single user, thereby enabling efficient utilization of the printing resources. Discrimination is made as to whether image formation is possible based on the image data transferred from a host apparatus, according to the printing condition based on such image data, and the image data are stored in a memory device in case the image formation is judged to be impossible. Preferably, even if image formation is possible, a discrimination is also made as to whether fully adequate image formation is possible. In addition, there may be formed a list of the images in order to enable judgment by a user of the images of all the received pages or, after the image forming operation, identification of the images of the pages for which the image formation is judged to be impossible.

16 Claims, 7 Drawing Sheets

FIG. 3

<LIST OF IMAGES NOT PRINTED>

RECEIVED JOB NO.=#980329-015

P008
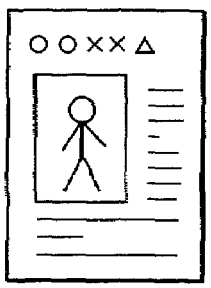
HIGH-QUALITY
PAPER NOT SET
PHOTO-HEAD
NOT MOUNTED
TEST-PRINTED
PAGE PRESENT P012
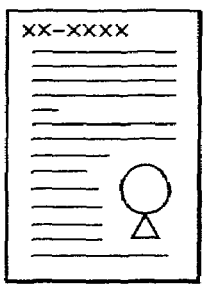
A3 PLAIN PAPER
NOT SET
TEST-PRINTED
PAGE PRESENT P039
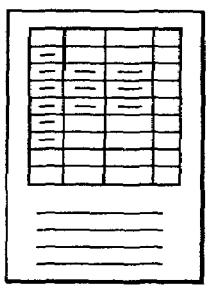
A3 PLAIN PAPER
NOT SET
TEST-PRINTED
PAGE PRESENT P046
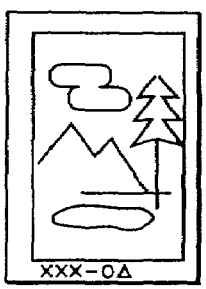
HIGH-QUALITY
PAPER NOT SET
PHOTO-HEAD
NOT MOUNTED
TEST-PRINTED
PAGE PRESENT P051 ⟶ P064
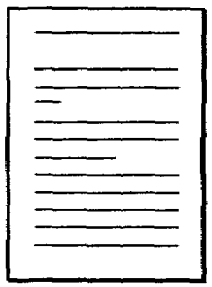 ~ 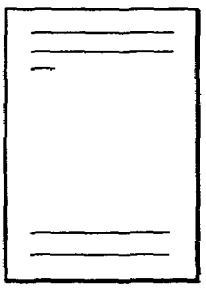

A4 PLAIN PAPER
EXHAUSTED

MUMBER OF TOTAL PAGES=064

MUMBER OF PRINTED PAGES=044

MUMBER OF NOT-PRINTED PAGES
(NUMBER OF TEST-PRINTED PAGES)=017(004)

<LIST OF IMAGES NOT PRINTED>
RECEIVED JOB NO.=#980329-056
P003
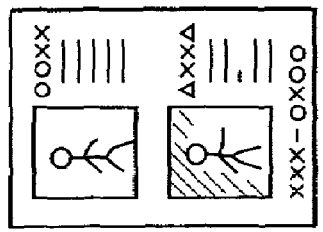
>10 MINS 30 SECS
TEST-PRINTED
PAGE PRESENT
P008
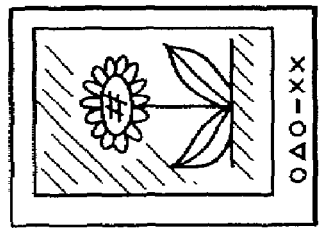
>6 MINS 10 SECS
TEST-PRINTED
PAGE PRESENT
NUMBER OF TOTAL PAGES=012
NUMBER OF PRINTED PAGES=010
NUMBER OF NOT-PRINTED PAGES
(NUMBER OF TEST-PRINTED PAGES)=002(002)
PERMITTED PRINTING PERIOD OF TIME=5 MINS 00 SEC
FIG. 4

IMAGE PRINTING APPARATUS, IMAGE PRINTING SYSTEM, IMAGE DATA PROCESSING METHOD AND MEMORY MEDIUM

BACKGROUND OF THE INVENTION

1. Field of the Invention

The present invention relates to an image forming apparatus capable of receiving, through an interface, a signal line, etc., image data corresponding to a character or an image, transmitted from a host apparatus such as a personal computer, and capable of forming an image on printing medium such as paper or a thin plastic plate based on the received image data.

In particular, the present invention relates to an image forming apparatus adapted to be connected to a network and to be used in common by plural host apparatuses.

2. Related Background Art

As for an image forming apparatus (hereinafter also called printing apparatus) for printing on a printing medium a text or the like prepared in a computer or a word processor, laser beam printer (LBP) and ink jet printer have recently replaced the conventional dot matrix printer and have become popular.

At present, there are already commercialized an LBP capable of representing gradations in high quality with a high resolution, and an ink jet printer capable of representing not only a color image of business purpose with 8 to 16 colors but also a full color image of photographic quality.

On the other hand, in order to fully exploit the printing performance of such high-performance printers, there are commercialized various high-quality printing media such as glossy paper, coated paper, glossy film, etc.

There is also commercialized a high-quality multi-functional printer capable of preparing various on-demand prints by storing sheets of plural kinds or sizes and by being provided with plural printing heads.

Also, with respect to print data (hereinafter also called image data) to be printed by such printers, it becomes possible to easily create not only the print data of conventional monochromatic text but also those containing color graphics or natural photographs by merely utilizing an ordinary word processing application software functioning on a personal computer (PC), owing to the recent rapid progress in the PC technology, whereby there is being realized an environment for handily producing high-quality on-demand prints. Also, with respect to the printer driver software for processing the print data prepared by such application software so as to match the printer or for transferring the print data to such printer, there is already commercialized a software capable of automatically analyzing the print data and automatically selecting appropriate print medium and print mode for each page.

Such on-demand prints are prepared particularly in the office environment. With the rapid spreading of the network environment in recent years, the PC is not used independently in the office but plural PC's are connected to a network in order to share various data and information. In such environment, the printer is not directly connected to the individual PC but is connected as a printer server to the network and is shared by the plural client PC's.

However, in case of preparing the on-demand prints in the office environment or the like by transferring the print data to the high-quality multi-functional printer connected to the network through the aforementioned printer driver software capable of automatically selecting the print medium and the print mode, if a printing operation cannot be continued because the print medium of the selected kind is not available or is exhausted in the course of the printing operation or because the print head to be used in the selected print mode is not loaded in the printing apparatus, the printing apparatus is continuously in the waiting state. As a result, unless a user who has instructed the printing operation executes a print canceling process for canceling the printing operation, other users are unable to use such printer.

Such locked state of the printer can be released by providing the printer driver software with a function of forcedly executing a print canceling process in case the waiting state of the printer continues for a predetermined period. In such configuration, however, the print output is forcedly canceled in the course of the printing operation. For example, when after a printing operation for 100 sheets is started, the entire printing operation is canceled merely because a color photographic image incidentally contained in only one sheet in the early part of the printing operation cannot be properly printed, the printer has to be considered less convenient for use by the automation of the printing apparatus.

SUMMARY OF THE INVENTION

In consideration of the foregoing, the object of the present invention is to provide an image forming apparatus, an image printing system, an image processing method and a memory medium capable of preventing a situation where a user occupies the image printing apparatus for a long period, thereby enabling effective utilization of the printing resources.

The above-mentioned object can be attained, according to the present invention, by an image forming apparatus for forming an image on a printing medium, based on image data transferred from a host apparatus, comprising:

discrimination means for discriminating whether the image formation is possible, based on transferred image data; and control means adapted, in case the discrimination means identifies that the image formation is not possible, to cause a memory device capable of storing image data to store the image data transferred from the host apparatus.

According to the present invention, there is also provided an image printing system composed of a host apparatus for transmitting image data and an image forming apparatus for forming an image on a printing medium based on image data transferred from the host apparatus through a transmission line, wherein the host apparatus comprises:

calculation means for calculating the amount of image data to be transmitted to the image forming apparatus;

discrimination means for discriminating whether or not to transmit the image data to the image forming apparatus through the transmission line, based on the result of calculation by the calculation means; and control means for storing the image data in a memory device in case the discrimination means identifies that the image data are not transmitted to the image forming apparatus.

According to the present invention, there is also provided an image printing system composed of a host apparatus for transmitting image data and an image forming apparatus for forming an image on a printing medium based on the image data transferred from the host apparatus through a transmission line, comprising:

memory devices provided on both of the host apparatus and the image forming apparatus and capable of storing information on a detachable memory medium;

wherein the host apparatus includes calculation means for calculating the time required for image formation by the image forming apparatus and selection means for selecting whether to transmit the image data to the image forming apparatus or to supply the image forming apparatus with the image data through the detachable memory medium, based on the result of calculation by the calculation means.

According to the present invention, there is also provided an image data processing method for use in an image printing system composed of a host apparatus for transmitting image data, an image forming apparatus for forming an image on a printing medium based on the image data transmitted from the host apparatus through a transmission line, and a memory device for storing the image data, the method comprising:

a discrimination step of discriminating whether the image formation is possible, based on the transmitted image data; and a step adapted, in case the discrimination step identifies that the image formation is not possible, to cause the memory device to store the image data transferred from the host apparatus.

According to the present invention, there is also provided an image data processing method for use in an image printing system composed of a host apparatus for transmitting image data and an image forming apparatus for forming an image on a printing medium based on the image data transmitted from the host apparatus through a transmission line, the method comprising:

a discrimination step of discriminating, prior to the transmission of the image data from the host apparatus to the image forming apparatus, whether the data amount of said image data or the estimated time required for printing the image data exceeds a predetermined value; and a step of storing, in case the discrimination step identifies that the predetermined value is exceeded, the image data in a memory device connected to the host apparatus.

There is also provided a memory medium storing a program for realizing the above-mentioned image data processing method.

BRIEF DESCRIPTION OF THE DRAWINGS

FIGS. 3 and 4 are views showing examples of a list of unprinted images;

DESCRIPTION OF THE PREFERRED EMBODIMENTS

In the following the present invention will be clarified in more detail by an embodiment exemplified by an image printing system consisting of an image forming apparatus, a host apparatus, etc., with reference to the accompanying drawings. The present invention is not limited to the embodiment in the form of an apparatus such as an image printing apparatus or an image printing system but can also be realized, based on the following description of the embodiments, as an image data processing method or a memory medium such as a CD-ROM storing a program for realizing such method.

First Embodiment

Figure 1:
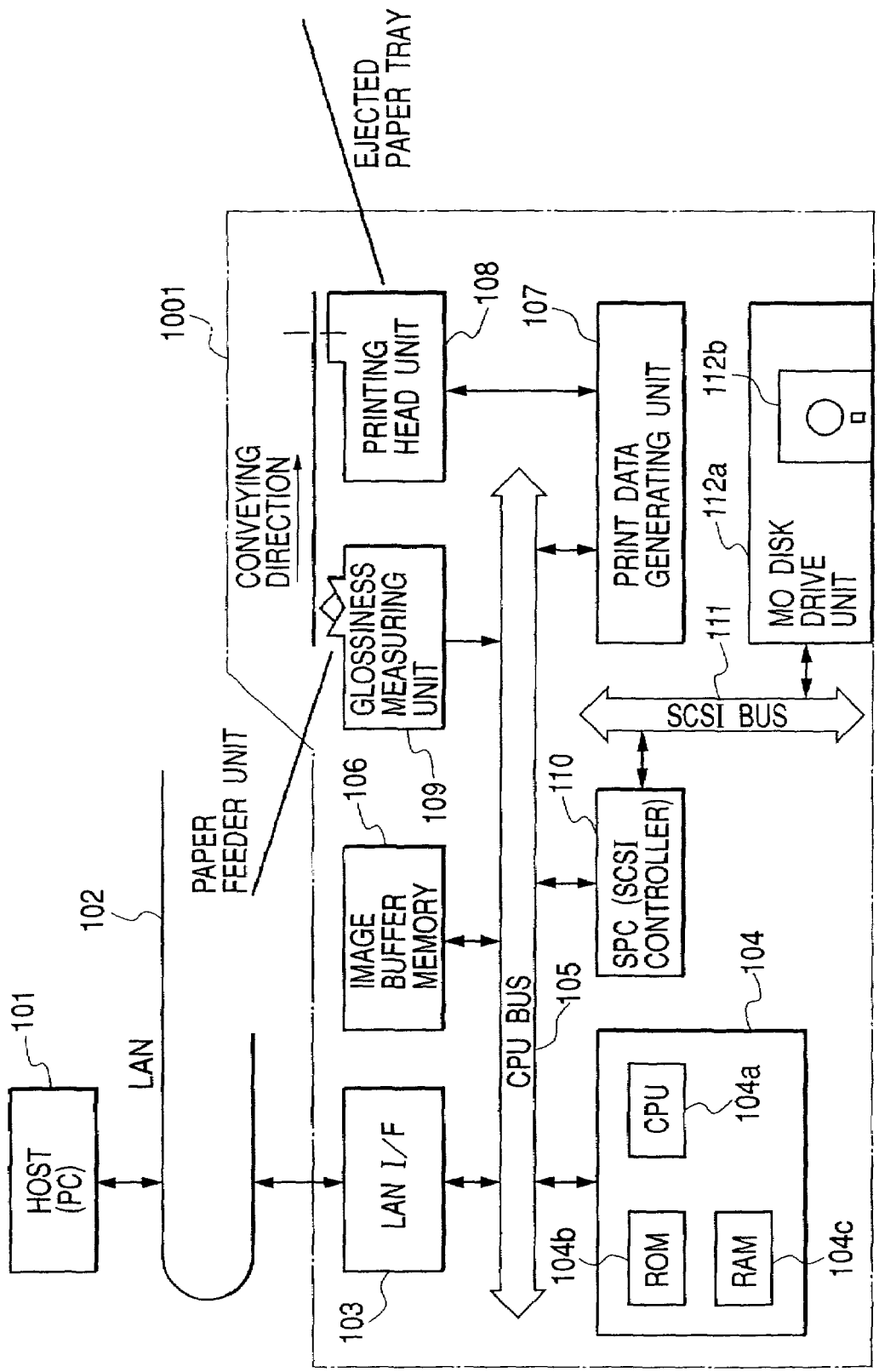
FIG. 1 is a block diagram showing the schematic configuration of an image forming apparatus capable of embodying the present invention, and a system consisting of the image forming apparatus and a host apparatus.

FIG. 1 is a block diagram showing the configuration of an image printing system in which the present invention is applicable. The system shown in FIG. 1 is composed of a host apparatus 101 and an image forming apparatus 1001 connected to the host apparatus 101 through a signal line 102 of a network (hereinafter called network line). In general, plural PC's constituting the host apparatus are connected to the network, but other host apparatus are omitted in FIG. 1.

Now the present embodiment will be explained in detail with reference to FIG. 1, showing a system consisting of the host apparatus 101 such as a PC, and a printer apparatus 1001 connected through the network line 102 such as a LAN.

Image data prepared by an application software functioning on the host apparatus 101 are converted, by a printer driver software also functioning on the host apparatus, into data of a format with control codes including the print mode designation automatically selected from the sheet/print head information obtained from the printer (not only on the currently existing printers but also on the potentially available printers) and the kind of the image data themselves (for example, print quality information such as character, graphics or photograph and print color information such as monochromatic binary, gray scale, business color or full-color), and are thereafter transmitted to a LAN interface unit 103 of the printer apparatus 1001 through the network line 102. The data received by the LAN interface unit 103 are subjected, by a control unit 104, to the removal of the added control codes and are temporarily stored in an image buffer memory 106 according to the result of analysis of the control codes.

The printer driver software, usually not requiring to inform a user of its function from time to time, is generally executed in the background while the application software is executed.

The control unit 104 is provided with a CPU 104a, a ROM 104b, and a RAM 104c, and program codes of various control programs are written in advance in the ROM 104b. The CPU 104a executes various processes according to the program codes stored in the ROM 104b. The RAM 104c is used as a temporary memory area for temporarily storing the data. In case the image data transfer between the LAN interface unit 103 and the image buffer memory 106 has to be executed at a high speed, it is also possible to provide the CPU 103a with a DMA controller (DMAC) (not shown) and to execute the image data transfer by activating such DMAC without the intervention of the software of the CPU 104a. The control codes and the image data described above are transferred through a CPU bus line 105.

When the image data of a suitable amount are prepared in the image buffer memory 106 through the above-described functions, such image data are transferred in succession to a print data generation unit 107 under the control of the CPU 104a (or unrepresented DMAC).

The configuration relating to the printing, starting from the print data generation unit 107, varies depending on the kind of the printer. For example, in case of a monochromatic LBP, the image data printed on the printing medium are binary pixel image data of black and white. So, the print data generation unit 107 cuts out the transmitted binary bit map image data of black and white for each line, and transfers the pixel image data in succession in synchronization with an image transfer clock signal, starting from a line start signal (beam detection (BD) signal) from a print head unit 108 provided in the LBP and composed of a laser beam generating unit and a rotating polygon mirror, thereby forming one image line. The image lines thus generated are transferred in succession onto the printing medium conveyed in the sub-scanning direction, through a rotating photosensitive drum, thereby printing the image of a page.

On the other hand, in case of an ink jet printer, it is provided with a recording head having plural nozzles as a printing unit for discharging ink, thereby forming an image by deposition of ink onto a printing medium. In such ink jet printer, the printing is achieved by reciprocating the printing head, having plural (n) nozzles along the conveying direction of the printing medium, in a direction perpendicular to such conveying direction, and, when the image data of n lines are prepared in the image buffer memory 106, such image data are read from the memory 106 in succession, by n pixels in the vertical direction at a time, matching the number of the nozzles of the printing head 108, and are transferred to such printing head 108, thereby executing the printing of one unit. Such operation is repeated in succession to print the image of one page.

Figures 2, 2A:
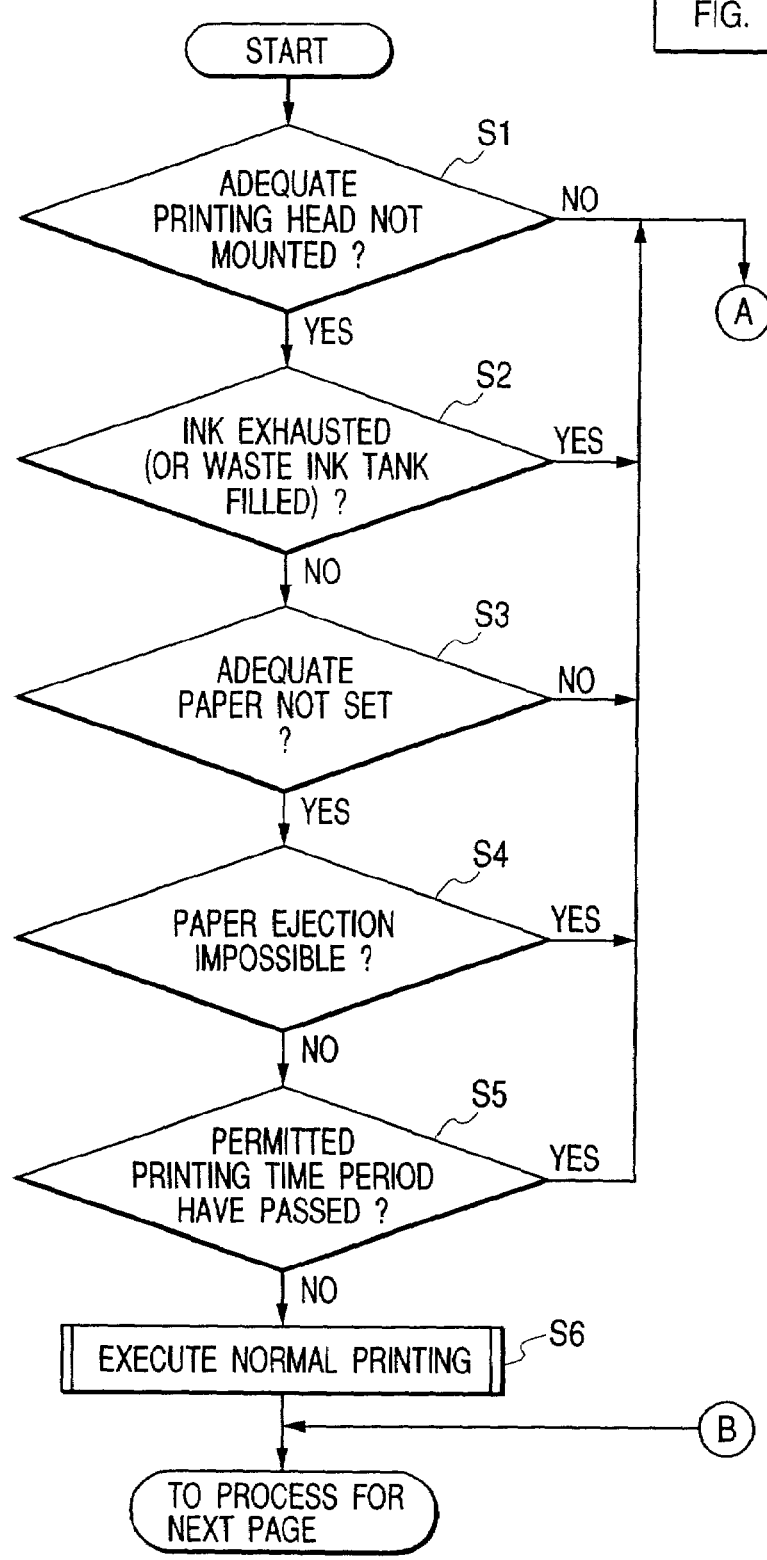
FIG. 2, composed of FIGS. 2A and 2B, is a flow chart showing a process for discriminating whether the image formation is possible, at the image formation.
Figure 2B:
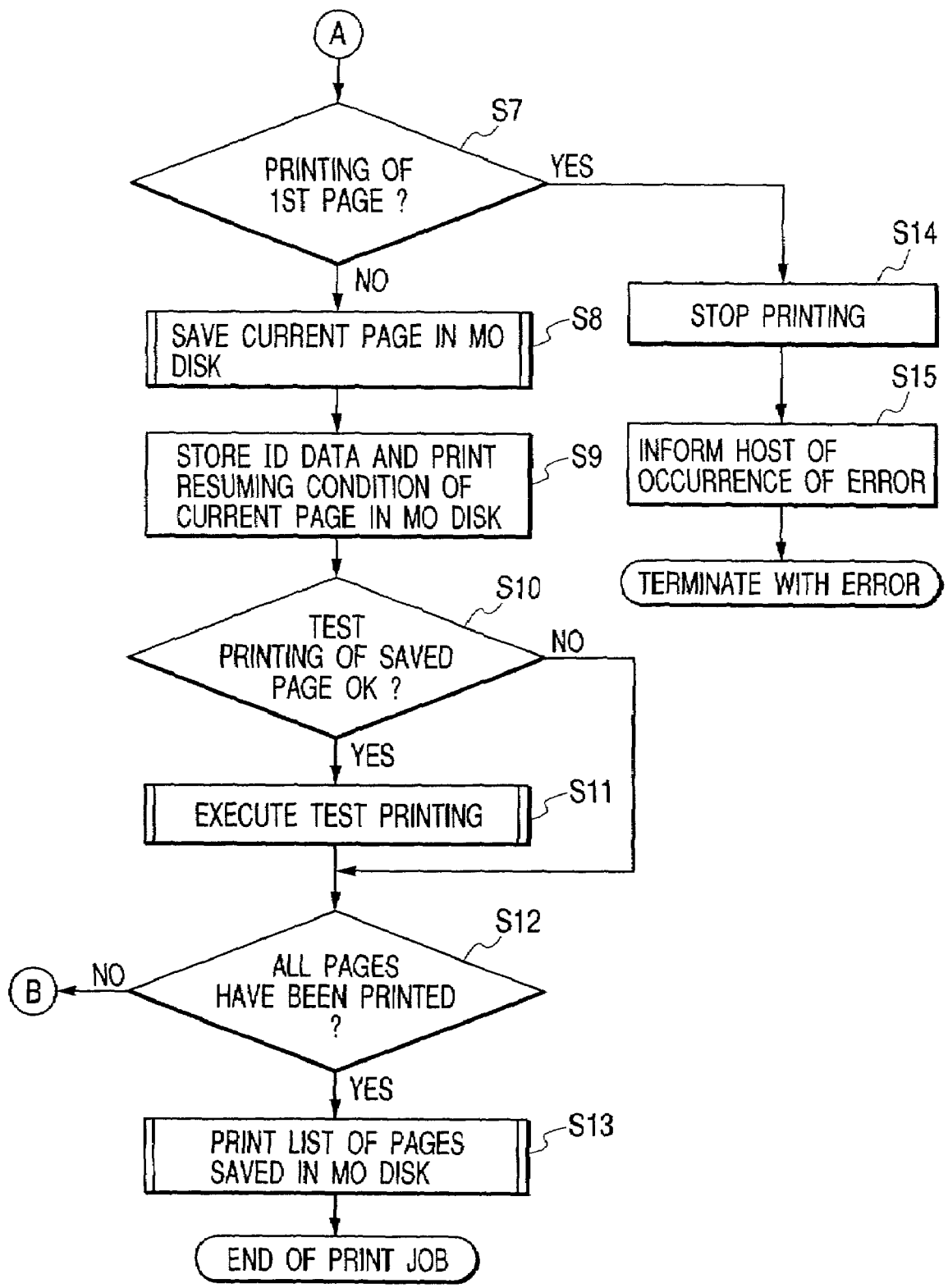

In the foregoing there has been explained the procedure of normal printing, but, in the printer of the present embodiment, there is discriminated, prior to the start of actual printing of the image, whether such image can be printed or not, according to a procedure shown in a flow chart in FIGS. 2A and 2B.

Referring to FIG. 2A, "a situation where an adequate printing head is absent" in a step S1 corresponds to a case of printing a color image of photographic quality with a former one among the two combinations of the printing heads to be explained later. On the other hand, the monochromatic printing is possible by the latter combination because black (Bk) ink is mounted.

For example, in an ink jet printer capable of mounting two printing heads, there are usually mounted a printing head exclusive for the black ink and a four-color printing head (yellow (Y), magenta (M), cyan (C) and black (Bk); black ink being included in order to improve the reproducibility of the pure black portion), in order to enable the monochromatic printing of a large amount and the color printing of ordinary quality at the same time. On the other hand, in order to print a photographic image with high quality, it is necessary to (1) replace the aforementioned printing head exclusive for the black ink by a pale color printing head (four colors of pale yellow (pY), pale magenta (pM), pale cyan (pC) and black (Bk); black ink being included in order to improve the reproducibility of the black portion) used for executing pale density recording by adjustment of dye-densities of inks, and (2) represent color gradation by discharging plural ink droplets in a same position and/or selectively depositing large and small ink droplets.

Also in FIG. 2A, a step S2 "ink exhausted or waste ink tank full?" is a procedure for discriminating whether the remaining amount of the ink, constituting the print forming material (or recording material), is in an exhausted state or in a reduced state, or whether a waste ink tank for accommodating the used ink is full. The remaining amount of the ink can be judged by various known technologies. Also in the ink jet printer, since the ink discharge performance of the recording head is deteriorated by the non-use period, there is already known to execute a recovery operation for recovering the state of the recording head, and the above-mentioned waste ink tank is provided in order to receive and contain the ink discharged from the recording head in such recovery operation. Also the ink discharged without being utilized in image formation is generally called waste ink.

For example, in printing the photographic image of high quality, it is necessary to use an exclusive printing sheet of high quality such as coated paper or glossy film, in addition to the mounting of the aforementioned recording head exclusive for photographic printing. In FIG. 2A, a state "adequate paper absent" in a step S3 corresponds to a case where such sheet is not mounted in a sheet feeding tray or in a sheet feeding cassette, or a case where such high-quality sheet alone is mounted in case of the ordinary printing.

More specifically, by causing a surface gloss measuring unit 109 provided in a sheet feeding unit of the printer to work on the printing medium, the kind of the printing medium can be judged from the result of measurement of the surface gloss.

There is also included a situation where the printing media of A3 size are not mounted and those of A4 size alone are mounted in case of printing the image data for which the A3 size is designated.

There is naturally included a situation where the printing media to be used are not available or are exhausted in the course of the printing operation.

Also in the flow chart shown in FIG. 2A, a step S4 "paper ejection impossible" corresponds to a state where the discharged sheets are loaded on a sheet discharge tray to the full capacity thereof, or where, in a printer with a bin sorter capable of simultaneously accepting plural print jobs and assigning the plural trays of the bin sorter respectively to such print jobs, all the trays are already in use so that the tray cannot be assigned to a new print job.

For example, the printing of a color image of photographic quality over the entire printing medium may require a printing time of tens of minutes since the plural ink droplets have to be discharged in mutual overlapping over the entire printing medium as explained in the foregoing. The occupation of a shared printer connected to the network by a single user for such a long time damages the proper utilization of the shared resources. For this reason, a limit time, for example 5 minutes, is permitted in advance for printing a page, and a "permitted printing time passed" state in a step S5 in FIG. 2A means a state where the printing time calculated for the image data prior to the start of printing operation exceeds 5 minutes set in advance.

In case the image data are discriminated not printable in the procedure shown in the flow chart in FIGS. 2A and 2B (in case of YES in any of the steps S1 to S5), a step S7 discriminates whether the printing is for the first page, and, if not, the sequence proceeds to a step S8. In the printing apparatus 1001 of the present embodiment, through steps S8 and S9, the image data in the image buffer memory 106 are transferred through an SPC (SCSI protocol controller) 110 to a SCSI bus 111, and are accumulated, together with necessary management data, in a magnetooptical disk 112b set in a magnetooptical disk drive 112*a* connected to the SCSI bus 111. Also these operations are controlled by the CPU 104*a* (or by an unrepresented DMAC) through the CPU bus 105. The magnetooptical disk 112*b* in the magnetooptical disk drive 112*a* is a memory medium for storing information and is detachable from the disk drive 112*a*.

In case the image data are not printed but stored once in the magnetooptical disk 112*b* through the above-described procedure, the CPU 104*a*, if so instructed in advance, reads the image again from the magnetooptical disk 112*a* and tries to execute trial printing of the image utilizing a currently available printing mode (step S10).

If the trial (or test) printing is possible, the CPU 104*a* executes such trial printing, and, if so instructed in advance, additionally prints additional information indicating a trial print (for example, a character train "trial print" or "test-printed") on the printing medium (step S11). If the step S10 identifies that the trial printing is not possible, the sequence proceeds to a step S12.

In case the foregoing step S7 identifies the printing is for a first page, steps S14 and S15 terminate the printing operation and inform an error of the host apparatus, whereby the error process is terminated.

A step S12 discriminates whether the printing of all the pages have been completed, and, if not, there is executed the process for a next page, but, if completed, the sequence proceeds to a step S13.

After all the designated image data are processed according to the above-described procedure, a list of the image data stored in the magnetooptical disk 112*b* is printed if so instructed in advance, whereupon the printing job is terminated (step S13). The list is an image showing a table, including identification information for identifying the image data stored in the magnetooptical disk and information on the condition of image formation based on the image data.

FIG. 3 shows an example of the list of the unprinted images in the present embodiment. In the example shown in FIG. 3, the table shows, for each page that has not been properly printed, the page number, a reduced image of the unprinted image corresponding to such page and the reason why the printing could not be executed. The number indicating the page and the image correspond to the information for identifying the image data. Also the information on the image forming condition corresponds to the size of the printing medium corresponding to the image data and the recording head to be used in the printing.

Also the image in the table format shown in FIG. 3 contains the following information:

print job information including image data and page number of such image data;

a thumbnail (reduced) image processed/generated from the image data;

size information of the printing medium corresponding to the image data;

total page number of the normally printed image data;

total page number of the image data suspended from printing; and total page number of the trial printed image data.

The list may be recorded on a printing medium with the information suitably selected for a user among the above-mentioned information.

Also as the printing of such list itself may become impossible for example in case the printing sheet or the ink is exhausted, it is preferable to record a copy of the list in the magnetooptical disk 112*b* in such a format that can be directly viewed by the user using another PC or the like.

FIG. 3 shows an example in which the pages 51 to 64 could not be printed because the A4-size sheets are exhausted, and, in such state, it is required to supplement sheets in the apparatus in order to print the list shown in FIG. 3. Therefore, by storing the list in the magnetooptical disk 112*b* in a format viewable on a PC, the user can obtain the information on the unprinted pages, utilizing a PC connected to the network. Also the image forming apparatus may be so constructed as to start the printing of the list, upon detecting the supplement of the sheets into the apparatus.

FIG. 4 shows an example of the list of the unprinted images in the present embodiment. The list shown in FIG. 4 shows an example where the print output is suspended because the required printing time is anticipated to exceed a limit time set in advance.

If a printer of the same kind is available in the vicinity, it is naturally possible to remove the magnetooptical disk 112*b* from the printer and to additionally print the unprinted image data by such printer of the same kind.

For example, in case the image data are not printed but stored in the magnetooptical disk 112*b* based on the before-mentioned two combinations of the recording heads, if the printing head is replaced on the same printer, it becomes necessary to print a predetermined pattern on the printing medium and to automatically or manually execute a correcting operation in order to correct the physical aberration in the mounting between both heads, resulting from the head replacement. In such case, therefore, it is preferable to use a printer of the same kind in the vicinity which is capable of directly printing in the desired printing mode.

Such printer of the same kind can naturally be an identical printer having a magnetooptical disk drive therein, but can also be an ordinary printer connected to a PC having a magnetooptical disk drive (though there is required an ability of printing in the predetermined printing mode), and the latter is rather preferable in practice for the additional printing by confirming the necessary conditions in interactive manner on the display of the PC, utilizing a utility software functioning under the environment of such PC.

As explained in the foregoing, since the present embodiment is provided with a magnetooptical disk drive in the printer connected to the network, it can temporarily store the image data transmitted from the host apparatus, in the magnetooptical disk instead of waiting in an "error" or "recovery waiting" state in case such image data cannot be printed for some reason, whereby the print job instructed from the host apparatus can be executed to the end without interruption in most cases and there can be avoided a situation where the shared printer becomes unusable because of a specified error of a specified user.

Besides, in connection with the above-mentioned process, the present embodiment can temporarily store the image data for which a long printing time is anticipated, whereby avoided is a situation where the shared printer is occupied for a long time by a single user.

Further, there is provided a function for printing "a list of unprinted images", "a trial print", etc. in case the image data are suspended from printing and stored in the magnetooptical disk, whereby it is possible to confirm, to a certain extent, the content of the image suspended from printing and to significantly facilitate the operation of additionally printing the image data in the magnetooptical disk later and incorporating such additional print in a necessary position of the bundle of the prints prepared earlier.

Second Embodiment

Figure 5:
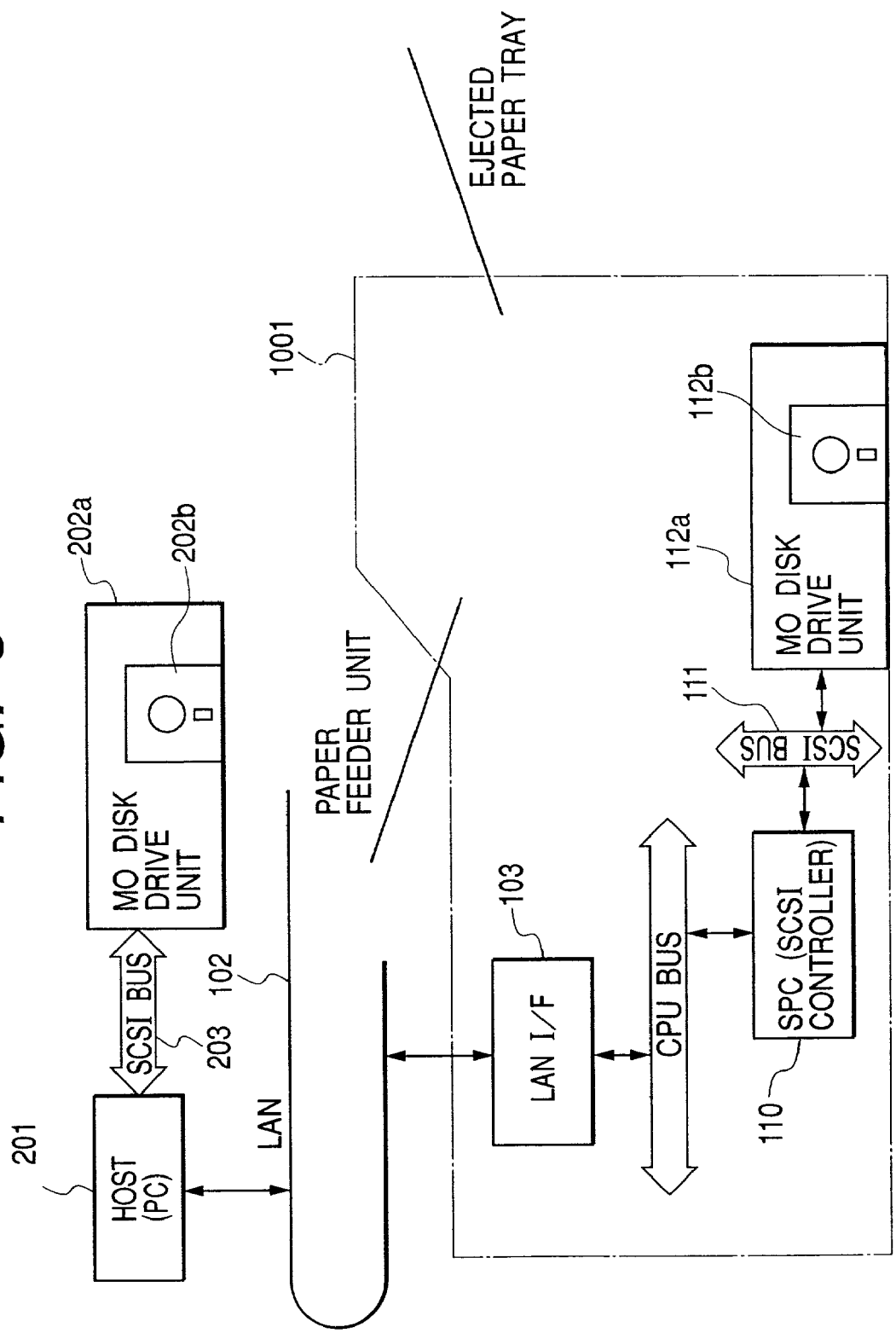
FIG. 5 is a block diagram schematically showing the configuration of an image forming apparatus in a second embodiment of the present invention, and a system consisting of the image forming apparatus and a host apparatus.

FIG. 5 is a block diagram showing the configuration of an "image printing system", constituting a second embodiment of the present invention and composed of a host apparatus 201 such as a PC having a SCSI interface, a printer 1001 connected through a network line 102 such as a LAN, etc. This system is different from that of the first embodiment shown in FIG. 1, in that a magnetooptical disk drive 202a and a magnetooptical disk 202b are connected through a SCSI interface line 203 of the host apparatus 201. In the system shown in FIG. 5, the printer 1001 which is an image forming apparatus is identical in the configuration with the printer 1001 shown in FIG. 1, so that the individual components constituting the printer 1001 will not be explained further.

In the following there will be explained the flow of the printing process in the system shown in FIG. 5.

Image data prepared by an application software functioning on the host apparatus 201 are converted, by a printer driver software also functioning on the host apparatus 201, into data of a format with control codes including the print mode designation automatically selected from the sheet/print head information obtained from the printer and the kind of the image data themselves (for example, print quality information such as character, graphics or photograph and print color information such as monochromatic binary, gray scale, business color or full-color).

Figure 6:
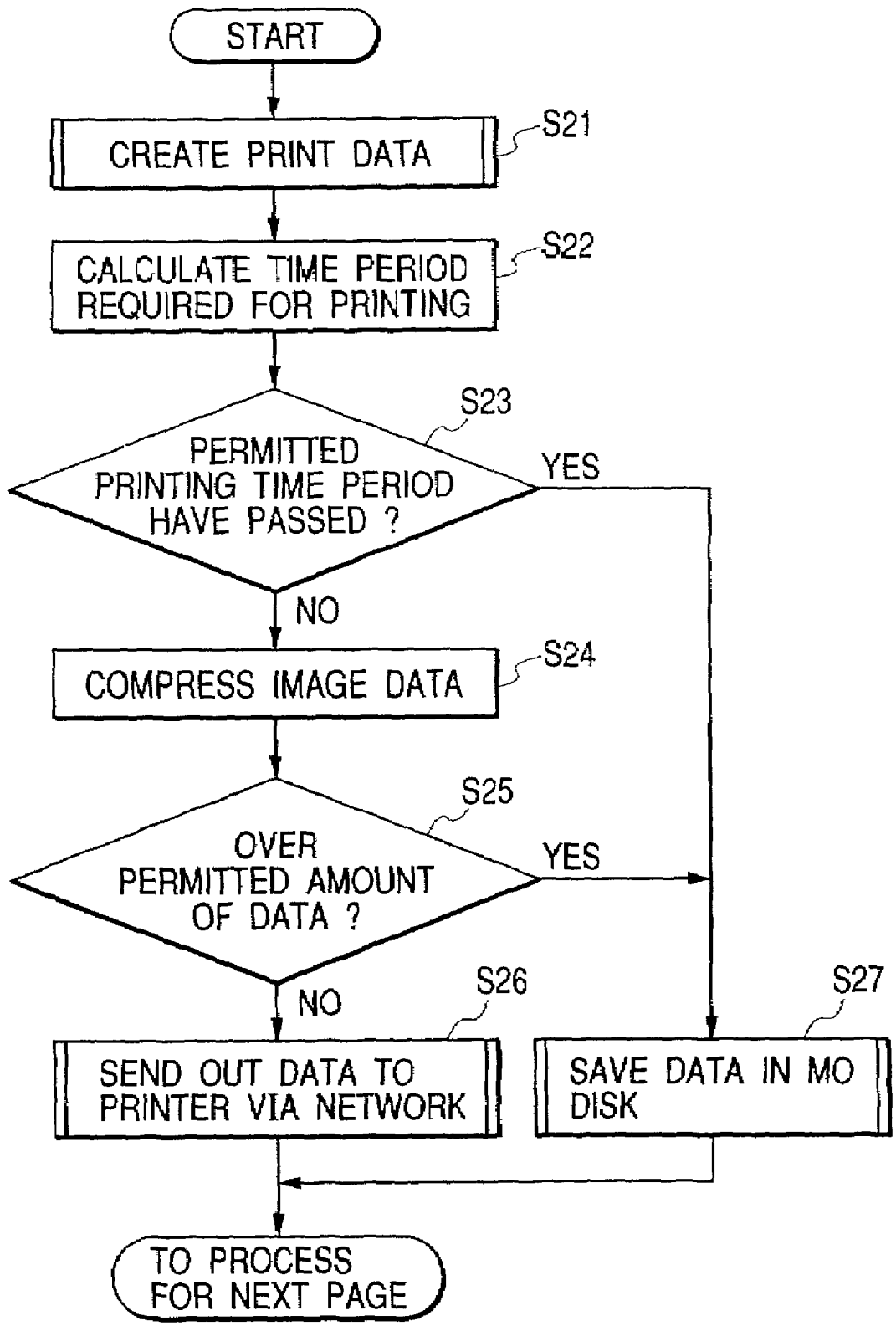
FIG. 6 is a flow chart showing a process for discriminating the image data destination by a printer driver software to be executed in the host apparatus.

Based on such data, the printer driver software either transmits the print data to the printer 1001 through the network 102 or temporarily stores the print data in the magnetooptical disk 202a, according to a procedure shown in a flow chart in FIG. 6.

In this operation, there is estimated an actual printing time on the printer, in addition to the amount of the data transmitted to the network. For example, in case of employing suitable data compression process (such as Huffman compression or pack bit compression), the amount of data actually flowing on the network is decreased but the printing on the printer 1001 after decompression of the received data is anticipated to require a longer time. Consequently, in the printing process executed by transferring thus compressed data, the load on the network 102 is not significant because of the reduced amount of the transferred data, but a long time is required in the data processing prior to the execution of printing, so that, as a result, the shared printer connected to the network is occupied for a long time by a single user. Such situation is not desirable in the utilization of the shared resources, and it is therefore preferable not to send the image data requiring a long printing time directly to the printer but to store such image data in the magnetooptical disk 202b.

In the following there will be explained, with reference to the flow chart shown in FIG. 6, the process of the present embodiment in the host apparatus.

A step S21 prepares data to be transmitted to the printer 1001. This process is executed, as explained in the foregoing, by an application software and a printer driver software functioning on the host apparatus 201. A next step S22 executes a calculation process for estimating the time required for printing. A next step S23 discriminates whether the estimated print time calculated in the step S22 is longer than a permitted print time, and, if longer, the sequence proceeds to a step S27 for writing the image data into the magnetooptical disk 202b. By this process, the image data requiring a long printing time are not transmitted to the printer at this point but are stored in the magnetooptical disk 202b. After the execution of the step S27, there is executed the process for a next page.

In case the step S23 identifies that the estimated print time does not exceed the permitted print time, the sequence proceeds to a step S24 for compressing the image data, and a next step S25 discriminates whether the amount of the compressed data exceeds a permitted data amount. If the step S25 identifies that the permitted data amount is not exceeded, the sequence proceeds to a step S26 for executing a process of transmitting the data to the printer. On the other hand, if the step S25 identifies that the amount of the compressed data exceeds the permitted data amount, the sequence proceeds to a step S27.

In the above-described procedure, if the image data are not printed but are once stored in the magnetooptical disk 202b, there may be executed, if necessary, the same process as that already explained in the first embodiment by means of a printer driver software, thereby generating "list of unprinted images" and "trial print output (including additional output indicating trail print)" as the related information.

In the flow chart shown in FIG. 6, the step S24 executes compression of the image data, but, in a configuration in which the data are transferred to the printer without compression in the host apparatus, the process of the step S24 is not executed and the process of the step S25 is executed on the uncompressed image data.

In the present embodiment, as explained in the foregoing, a magnetooptical disk drive is also provided in the host apparatus, and there is discriminated whether the "data amount" (data amount after data compression if such compression is executed) or the "estimated time required for printing" is larger than a predetermined value, prior to the transmission of the image data to the printer driver software, and, if larger, the image data are directly stored in the magnetooptical disk for printing in an available time of the printer on off-line basis or in another printer, whereby the network resources or shared printer resources can be prevented from being occupied for a long time by a single user. It is thus possible to operate the network system in a more efficient manner.

Also according to the present embodiment, the image data suspended from printing are recorded in the magnetooptical disk owned by a user of a PC constituting each host apparatus, so that more flexible operation is possible for each user, in comparison with the system of the first embodiment in which the suspended image data of plural users are stored together in the shared magnetooptical disk mounted on the printer.

Also there is provided a function of printing the "list of unprinted images", "trial print output", etc. in case the image data are suspended from printing and are stored in the magnetooptical disk, whereby it is possible to confirm, to a certain extent, the content of the images suspended from printing and to significantly facilitate the operation of additionally printing the image data in the magnetooptical disk and incorporate such additionally printed image in a necessary position in the bundle of prints outputted earlier.

In the foregoing, the present invention has been explained by the embodiments under the network environment, but, in case of printing documents prepared by using, for example, a word processing software, which contain a color photograph or complex graphics, by means of a printer, the function of storing the color photograph or the complex graphics requiring a long printing time in an external memory device and preparing index data such as a list of unprinted images or printing a trial print is effective not only in the network environment but also in an environment where the PC constituting the host apparatus and the printer are directly connected through an interface such as Centronics or USB (Universal Serial Bus).

As explained in the foregoing, the present invention allows to prevent the image printing apparatus from being occupies for a long time by a single user, thereby enabling efficient utilization of the printing resources.

In the foregoing embodiments, the storage device for storing the image data has been exemplified by a magnetooptical disk, but there may also be employed a hard disk (HD) for data writing and reading with a magnetic head, or a memory device capable of information recording with a laser beam (such as a CD-R allowing information writing only, or a CD-RW allowing information writing and re-writing). These memory devices are common in that the stored information can be conserved even in case the operation of the system has to be stopped because of a failure in the network, or in the host apparatus or the printer constituting the system. They are also common in having a large capacity for the information storage and a low cost relative to the amount of the stored information.

Also, in the first embodiment, such memory device may be provided in the printer apparatus or connected thereto through an interface. Also in the second embodiment, such memory device may be connected to the host apparatus through an interface, or provided in the host apparatus.

What is claimed is:

1. An image forming apparatus for forming an image on a printing medium, based on image data transferred from a host apparatus, comprising:
    buffer means for temporarily storing the image data transferred from the host apparatus;
    discrimination means for discriminating whether or not adequate image formation is not possible even though image formation is possible, based on the image data stored in the buffer means; and
    a control unit adapted, in a case in which said discrimination means identifies that adequate image formation is not possible, to remove the image data from said buffer means into a memory device capable of storing image-data.

2. An apparatus according to claim 1, wherein said discrimination means discriminates whether the image formation by the image data is possible, based on information relating to a printing medium loaded in the image forming apparatus.

3. An apparatus according to claim 2, wherein the information relating to the printing medium includes at least one of the presence or absence of the printing medium, a size thereof, a kind thereof and a stacking condition of a sheet discharge tray on which the printing media after image formation are stacked.

4. An apparatus according to claim 1, wherein said apparatus is adapted to form an image by depositing a print forming material onto the printing medium by means of a mounted printing unit; and
    said discrimination means discriminates whether the image formation is possible, based on information relating to the printing unit of said image forming apparatus.

5. An apparatus according to claim 4, wherein the information relating to said printing unit includes at least one of the kind of the mounted printing unit, information on the remaining amount of the print forming material and full-state information of a holding portion for holding the print forming material not used for the image formation.

6. An apparatus according to claim 1, wherein said discrimination means discriminates whether the image formation is possible within a set time, based on information relating to time required for the image formation based on the image data.

7. An apparatus according to claim 1, wherein said control unit is adapted, in a case in which stored image data are present in the memory device, to form on the printing medium an image in the format of a list including identification information for identifying the image data and information relating to the condition in the image formation based on the image data.

8. An apparatus according to claim 7, wherein the information recorded as the image in the format of a list includes at least one of:
    print job information including the image data and a page number of the image data;
    a reduced image processed/generated from the image data;
    size information of the printing medium corresponding to the image data;
    a total page number of the image data printed in normal manner;
    a total page number of the image data suspended from printing;
    a total page number of the image data outputted by trial printing; and
    an estimated time required for the printing of the image data.

9. An apparatus according to claim 1, further comprising:
    a simplified printing unit for forming an image in a simplified manner, based on the image data stored in the memory means.

10. An apparatus according to claim 9, wherein said simplified printing unit forms an image on the printing medium by forming a simplified image and adding additional information indicating that the formed image is a simplified image.

11. An apparatus according to claim 1, wherein the memory device includes a detachable memory medium.

12. An apparatus according to claim 11, wherein the memory device is a magnetooptical disk drive capable of storing information including image data in a magnetooptical disk constituting the memory medium.

13. An apparatus according to claim 11, wherein the memory device is a device capable of storing information on a disk by means of a laser light.

14. An image data processing method for use in an image printing system composed of a host apparatus for transmitting image data, an image forming apparatus for forming an image on a printing medium based on the image data transmitted from the host apparatus through a transmission line, and a memory device for storing the image data, the method comprising:
    a buffering step of temporarily storing the image data transferred from the host apparatus;
    a discrimination step of discriminating whether or not adequate image formation is not possible even though image formation is possible, based on the image data stored in the buffer means; and
    a causing step of, in a case in which it is identified in said discrimination step that adequate image formation is not possible, to remove the image data from said buffer means into the memory device to store the image data.

15. An image data processing method according to claim 14, further comprising:

a step of causing the image forming apparatus to form on the printing medium an image including information indicating the image data for which the image formation is discriminated not possible, based on the image data stored in the memory device.

16. A computer-readable memory medium storing a program for realizing the image data processing method according to claim 15.

* * * * *